Sept. 22, 1953  R. A. STEPHENS  2,653,080
PROCESS FOR PRODUCING FERRIC OXIDE COMPOSITIONS OF
POLISHING ROUGE GRADE AND THE PRODUCT THEREOF
Filed Jan. 6, 1948
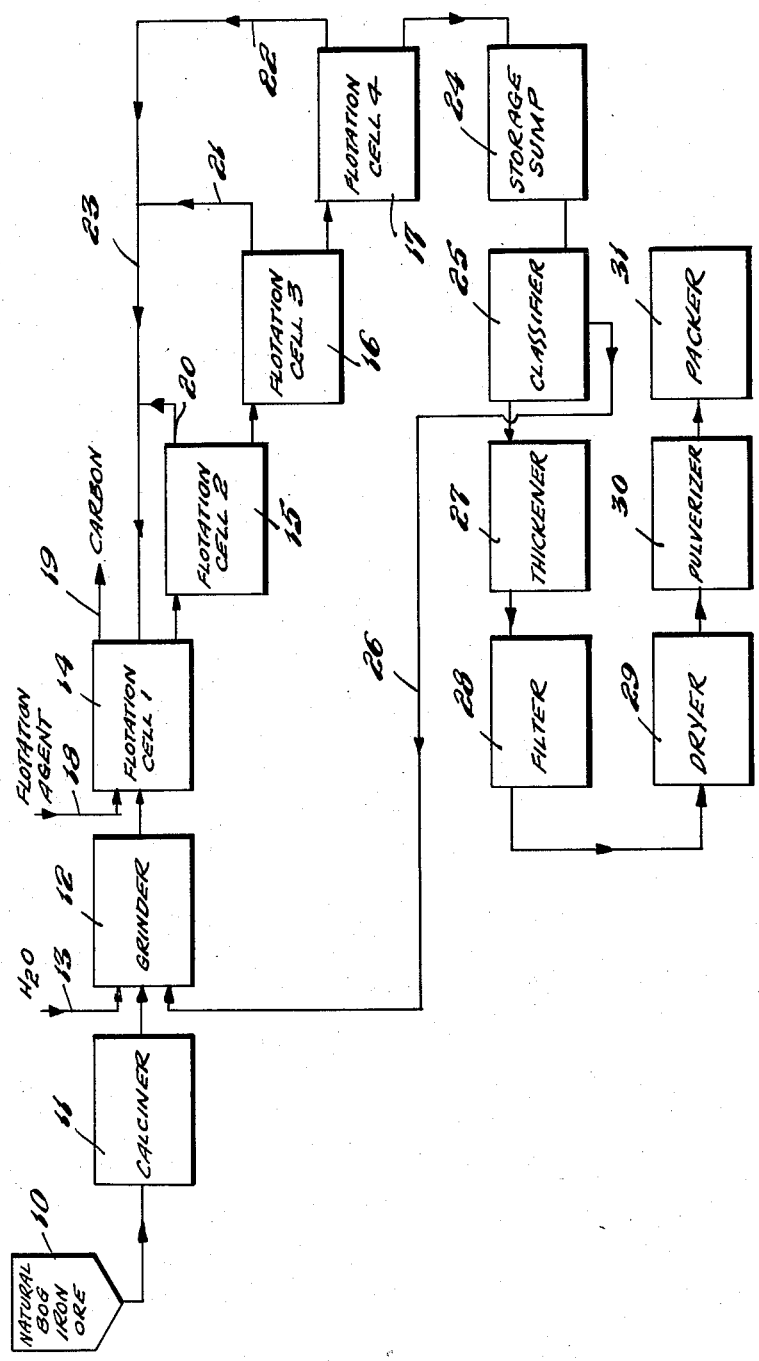
INVENTOR.
ROBERT A. STEPHENS
BY
Hammond & Littell
ATTORNEYS Patented Sept. 22, 1953

2,653,080

UNITED STATES PATENT OFFICE 2,653,080

PROCESS FOR PRODUCING FERRIC OXIDE COMPOSITIONS OF POLISHING ROUGE GRADE AND THE PRODUCT THEREOF

Robert A. Stephens, Palmer Township, Northampton County, Pa., assignor, by mesne assignments, to C. K. Williams & Co., East St. Louis, Ill., a corporation of Delaware Application January 6, 1948, Serial No. 801

7 Claims. (Cl. 23—200)

This invention relates to new ferric oxide compositions particularly adapted for polishing purposes and to methods by which such compositions may be produced.

The polishing efficiency of ferric oxide products depends upon their source as well as upon the method by which they are produced or purified. Although natural and synthetic ferric oxides have for many years been used for polishing and pigmenting purposes, high grade polishes for the most part have been produced by synthesis from chemical solutions. The oxides produced in this manner are extremely pure and the polishing qualities are quite high. Efforts to produce high grade polishing rouges from natural or crude raw materials have been commercially successful to only a limited extent due to the presence of impurities which either mask or cause deterioration of the abrasive qualities of the rouge.

An object of the present invention is to provide ferric oxide compositions having excellent polishing characteristics from a new source of raw materials. Another object is to provide efficient processes for producing ferric oxide compositions from such raw or crude materials adapted for large scale operations and operable at satisfactory costs.

There are a number of natural and byproduct iron oxide compositions constituting potential sources of polishing rouges which, because of their contamination with organic matter, have heretofore been considered unsuitable for the production of high grade polishing rouges. One might expect that these raw materials could be oxidized and purified adequately by calcination intended to burn off the organic material present, but considerable experimentation has revealed that calcination at temperatures designed to produce rouges of high abrasive power required by the industry leaves organic matter or a carbon content in the material which is detrimental to the polishing capabilities, whether it be of graphitic or amorphous character, due to a masking of the abrasive qualities, thereby initially reducing and progressively reducing the abrasive qualities as the same are used in polishing operations. Such experimentation has also revealed that calcination at temperatures sufficiently high to oxidize and completely remove the organic matter or carbon content does not produce rouges or iron oxides of a structure having sufficiently high abrasive power to satisfy commercial requirements. The loss of abrasive quality has been found to arise from the tendency of the carbon remaining in the iron oxide after the calcination to adhere to the polishing pads and in time to coat the same, with the result that the abrasive action of the rouge is substantially diminished.

It has now been discovered that high quality rouges, capable of maintaining high polishing rates over long periods of time, can be produced from either one of two classes of crude or raw iron oxide materials both of which contain organic impurities in objectionable amounts. The products of one of these classes is generally referred to as ferroso-ferric oxide sludges which are formed in the reduction of organic chemicals by iron in acid solution, such as in the reduction of nitrobenzene to aniline, the reduction of p-nitro-acetanilide to the corresponding amino compound, the reduction of aromatic polynitro-compounds to amino-nitro derivatives and other similar reduction processes. (Such processes are described, for example, in the text "Organic Chemistry" by Frank C. Whitmore, pages 739–740, D. Van Nostrand Company, Inc., 1938, and in the "Text-Book of Organic Chemistry" by Bernthsen and Sudborough, page 648, D. Van Nostrand Company, Inc.)

The other raw iron oxide material is natural bog iron ore. This ore contains various inorganic impurities and as well a substantial amount of organic matter principally of vegetable origin, including such materials as leaves, roots and the like.

The preferred process of the present invention capable of producing the ferric oxide compositions having the herein mentioned high polishing qualities, involves a combination of a calcining treatment with a carbon separation treatment applied to the calcined material. These treatments hereinafter defined more in detail very successfully remove the objectionable impurities and reduce the carbon content to an amount which does not in any way interfere with the continued abrasive action of the rouge even for the life of the polishing pads employed. Through experimentation it has been determined that in order for the rouge to possess these high qualities, the carbon content therein must not be in excess of 0.15%. The rouges manufactured from bog iron ore average between 92% and 93% ferric oxide, the balance being impurities composed mostly of complex forms of silica, alumina and iron aluminum silicates.

The process of the present invention may be readily understood from the accompanying flow sheet in which the process steps or pieces of apparatus are diagrammatically illustrated, the drawing being merely an illustration of a very satisfactory sequence of operations.

With reference to the drawing, there is shown a feed hopper 10 for the natural bog iron ore or the ferrosoferric oxide sludge hereinbefore described leading to a calciner 11 wherein the material is heated to a temperature of from 500° C. to 900° C. and wherein the iron oxide material is converted to ferric oxide, the organic matter and other impurities are partially vaporized or burned off, and wherein the remaining organic matter is reduced to carbon.

The calcined product is then transferred to grinder 12 to which water is added through the inlet pipe 13 and wherein the calcined material is finely ground preferably to a size most of the particles of which will pass through a 325 mesh screen. From the grinder the slurry formed is passed through a series of flotation cells, 14, 15, 16 and 17. Into the first cell 14, a floating agent composed of cresylic acid or pine oil or mixtures of the same is introduced through the inlet pipe 18. In the flotation treatment the carbon content rises to the surface and is floated off. From the first cell 14 the carbon, containing traces of ferric oxide, is floated off through the conduit 19 to waste or to storage.

The carbon-ferric oxide mixture floated off from the cells 15, 16 and 17 through conduits 20, 21 and 22 is returned through the conduit 23 to the first flotation cell 14 thereby recovering the ferric oxide content of the concentrates which otherwise would be lost.

From the fourth cell 17 the purified ferric oxide which has settled therein is flowed to the storage sump 24 from which it is subsequently pumped to a classifier 25 to separate the coarser particles from the adequately fine material. The coarse material is pumped from the classifier through the conduit 26 back to the grinder 12. The finely divided material from the classifier is then transferred to the thickener 27 wherein most of the water is removed. The thickened material is then passed through the filter 28 to remove an additional quantity of the water and from here the wet mass is transferred to the drier 29 from which the dried material is conveyed to the pulverizer 30 and finally to the packing machine 31.

From the foregoing description of the process it is evident that no chemical reagent is employed to alter the iron oxide or the impurities contained therein and that the impurities other than the carbon are present in the final product.

In processing 2000 pounds per hour of calcined ferrosoferric oxide sludge, it has been found in actual practice that the series of four cells of conventional type, each approximately 20 inches wide by 28 inches long by 24 inches deep, will reduce the carbon content of the material treated from 0.50% to 0.05%. More cells should be used if a larger throughput is desired and fewer cells may be used if a lesser throughput is effected. The slurry obtained in the grinding unit may contain from about 10% to 40% solids by weight.

Although the addition of the disclosed or other flotation agent is generally necessary to obtain proper flotation, it has been found that the carbon has a sufficient tendency to float to make the addition of promoters, depressants or activators unnecessary. Preferably the flotation cells are operated in such manner that most of the carbon is removed by the first three cells and only a trace by the fourth cell. The apparatus is preferably arranged such that the flow through the cells is accomplished by gravity and where necessary the material is conveyed between the other units by the use of suitable pumps or belts (not illustrated).

The present invention is not limited to the exact order of treatments illustrated in the drawing, for the cells may be placed at any point in the circuit where the rouge is in slurry form. Adequate carbon removal can generally be obtained even if the particles have not theretofore been ground to the ultimately required size.

The process described above applied to ferroso-ferric oxide sludge is applicable also to the treatment of natural bog iron ore.

The invention is not limited to any particular method by which the grinding is accomplished nor by which the ferric oxide obtained from the last flotation cell is prepared for marketing.

The performance of the polishing rouges of the present invention having low carbon content is evidenced by the following tests:

The first test measures the polishing rate of rouges during polishing of a Plano lens for a specified period of time, suitably about ten minutes, using a water slurry of the polishing material, the results being designated by the loss in weight of the lens in milligrams during the grinding period. This loss in weight or rate of removal is the measure of the polishing speed of the rouge.

A sample of calcined ferroso-ferric oxide sludge, obtained as a waste product in the reduction of nitrobenzene to aniline by iron in acid solution, containing 0.43% carbon had a rate of removal of 71 milligrams during a polishing period of ten minutes. A second sample of a calcined ferroso-ferric oxide sludge treated by the flotation treatment herein defined to reduce the carbon content to 0.12% had a rate of removal of 76 milligrams during the same polishing period.

In a second test using actual polishing shop practices, it was found that when the above-mentioned ferric oxide rouge containing 0.43% carbon was used on a polishing machine, not only was there a reduced initial polishing rate, but there was a gradual increase in the number of rejected lenses from the machine due to underpolishing although in such process the rouge slurry was renewed periodically. In contrast thereto, when the above-described ferric oxide rouge of the present invention containing 0.12% carbon was used in the same machine and under the same conditions, there was no increase in the number of rejected lenses due to any decreased polishing speed.

An examination of the felt pads used in the polishing operation employing the high carbon content rouge showed an accumulation of carbon, whereas an examination of the pads after employing the low carbon content rouge showed no accumulation of carbon. When the low carbon content rouge of the present invention is employed, the polishing pad can be used continuously in normal operations for a period of about two weeks until the pad itself wears out. In contrast thereto polishing operations using the high carbon content rouge require replacement of the pad every two days if a workable high polishing rate is to be maintained without having an excessive number of rejects.

The high grade rouges of the present invention are suitable for the polishing of lenses of the ophthalmic and precision type, also optical pieces such as reticles, prisms and the like and as well of plate glass and mirror glass.

Although the process of the invention is specifically designed for the treatment of natural bog iron ore and the ferroso-ferric oxide sludges to produce high grade polishing rouges, it is also suitable for the treatment of conventional iron oxide materials containing objectionable amounts of organic matter as impurities to provide purified products which, though not suitable as polishing rouges, are well received as pigments because of their brighter color. However, the carbon content need not be reduced to the low percentage required in the production of the high grade polishing rouges, for any substantial removal of the carbon leads to brighter colors, and the greater the carbon removal the brighter the color becomes.

In the production of the ferric oxide for pigmenting purposes, the calcination is conducted in a manner and at temperatures indicated by conventional calcining practice for obtaining ferric-oxide products of the desired shade. Regardless of the shade obtained, the treatment of the calcined product to reduce the carbon content in accordance with the herein-described process leads to brighter products.

The process as applied to ferroso-ferric oxide sludge and the products resulting therefrom are claimed in the copending application Serial No. 30 802 filed concurrently herewith.

It should be understood that the processes and the products of the present invention are not limited to the specific details set forth herein except as recited in the claims appended hereto.

I claim:

1. A process suitable for producing high grade polishing rouges and bright ferric oxide pigments from crude bog iron ore containing an objectionable amount of organic matter as well as the usual inorganic impurities which comprises altering the said crude iron oxide as to its content by the combination of steps consisting essentially only in (A) calcining the crude oxide at a temperature which converts the same to ferric oxide and at the same time burns off only part of the organic impurities of the crude oxide treated, thereby producing an impure ferric oxide product of desirable crystal structure but containing a detrimental amount of carbon, and (B) removing the remaining detrimental amount of carbon by subjecting the calcined product to flotation, thereby reducing the carbon content of the calcined material to an amount not in excess of 0.15% and thereby producing a ferric oxide product of high quality containing substantially only inorganic impurities from the crude oxide treated composed mostly of complex forms of silica, alumina, and iron aluminum silicates.

2. A process for producing a high grade polishing rouge which comprises calcining a mass consisting essentially only of natural bog iron ore at a temperature between 500° and 900° C. which produces iron oxide of a structure having a high abrasive power and leaves free carbon therein, grinding the ore, forming a slurry of the calcined ore, subjecting the slurry to a flotation treatment thereby reducing the carbon content of the calcined material to an amount not in excess of 0.15% thereby producing a ferric oxide product of high quality containing substantially only inorganic impurities from the crude oxide treated composed mostly of complex forms of silica, alumina, and iron aluminum silicates.

3. A process for producing a high grade polishing rouge which comprises calcining natural bog iron ore at a temperature which produces an iron oxide of a structure having a high abrasive power, which temperature is insufficiently high to burn off all the organic material present leaving carbon as an impurity, grinding the calcined ore to a fine particle size, forming a slurry of said calcined ore and subjecting the said slurry to a flotation treatment in the presence of a frothing agent whereby the carbon content of the calcined ore is floated, and substantially separating the floated carbon to an extent providing a ferric oxide product containing carbon in an amount not in excess of 0.15%, said product containing the inorganic impurities of the ore treated.

4. A process for producing a high grade polishing rouge which comprises calcining natural bog iron ore at a temperature between 500° and 900° C. which produces iron oxide of a structure having a high abrasive power and leaves free carbon therein, grinding the calcined ore, forming a slurry of the resulting ferric oxide carbon mixture, subjecting the slurry to a flotation treatment in which the carbon is floated, substantially completely separating the floated carbon thereby providing ferric oxide containing carbon in an amount not in excess of 0.15% together with the inorganic impurities of the ore treated and classifying the ferric oxide mass obtained to provide a ferric oxide product at least as fine as 325 mesh particle size.

5. A rouge of glass-polishing grade derived by calcination of a material selected from the group consisting of bog iron ore and ferroso ferric oxide sludge, said rouge being composed of at least about 92% ferric oxide, the balance being composed mostly of complex forms of silica, alumina and iron aluminum silicates, derived from the material treated and containing not more than 0.15% residual carbon as an impurity, the said material having been altered as to its content substantially only by (1) calcining the material at a temperature between 500° and 900° C. and (2) removing residual carbon from the calcined product while leaving the inorganic components of the calcined product unchanged.

6. A rouge of glass-polishing grade composed of calcined bog iron ore, said rouge having about 92–93% ferric oxide, the balance being composed mostly of complex forms of silica, alumina and iron aluminum silicates and carbon in an amount not in excess of 0.15%, said product being obtained by calcining a mass consisting essentially only of bog iron ore, which contains both organic and inorganic impurities, at a temperature between 500° and 900° C. thereby (1) imparting high abrasive power to the ferric oxide crystals produced, (2) separating a part of the organic impurities by burning and volatilization, and (3) leaving an amount of carbon which if not removed would prevent successful use of the calcined product as a high grade polishing rouge, grinding the carbon-containing calcined mass to a powder, and physically separating carbon from said calcined mass without altering the crystal structure or inorganic impurity content thereof, thereby providing the rouge having not more than the stated amount of carbon impurity.

7. A calcined bog iron ore polishing rouge composed of at least about 92% ferric oxide, the balance being composed mostly of complex forms of silica, alumina, and iron aluminum silicates, produced by the process which comprises altering bog iron ore as to its content by the combination of steps consisting essentially only in (A) calcining the crude oxide at a temperature which converts the same to ferric oxide and at the same time burns off only part of the organic impurities of the crude oxide treated, thereby producing an impure ferric oxide product of desirable crystal structure but containing a detrimental amount of carbon, and (B) removing the remaining detrimental amount of carbon by subjecting the calcined product to flotation, thereby reducing the carbon content of the calcined material to an amount not in excess of 0.15% and thereby producing a ferric oxide product of high quality containing substantially only inorganic impurities from the crude oxide treated composed mostly of complex forms of silica, alumina, and iron aluminum silicates.

ROBERT A. STEPHENS.

References Cited in the file of this patent

UNITED STATES PATENTS

| Number | Name | Date |
| --- | --- | --- |
| 1,428,521 | Bacon | Sept. 12, 1922 |
| 1,455,060 | Bacon | May 15, 1923 |
| 1,634,615 | Hall et al. | July 5, 1927 |
| 1,793,942 | Laux | Feb. 24, 1931 |
| 1,806,888 | Buchanan | May 26, 1931 |
| 1,837,709 | Heckman | Dec. 22, 1931 |
| 1,849,428 | Laux | Mar. 15, 1932 |
| 1,943,948 | Castner et al. | Jan. 16, 1934 |
| 2,105,670 | Perkins | Jan. 18, 1938 |
| 2,183,500 | Crawford | Dec. 12, 1939 |
| 2,203,905 | Heckman | June 11, 1940 |
| 2,298,984 | Stinson et al. | Oct. 13, 1942 |
| 2,363,315 | Grothe | Nov. 21, 1944 |
| 2,396,398 | Turbett | Mar. 12, 1946 |